United States Patent [19]

Stephenson

[11] Patent Number: 4,590,751
[45] Date of Patent: May 27, 1986

[54] DOUBLE WINDROWING ATTACHMENT FOR HARVESTER

[75] Inventor: Roger D. Stephenson, Bloomfield, Iowa

[73] Assignee: Deere & Company, Moline, Ill.

[21] Appl. No.: 622,364

[22] Filed: Jun. 20, 1984

[51] Int. Cl.⁴ ............................................ A01D 57/20
[52] U.S. Cl. ......................................... 56/192; 56/181
[58] Field of Search .................... 56/192, 228, 6, 13.6, 56/218, 181, 11.2; 172/248

[56] References Cited

U.S. PATENT DOCUMENTS

| | | | |
|---|---|---|---|
| 3,696,598 | 10/1972 | Weichel | 56/192 |
| 4,037,390 | 7/1977 | Vogelenzang | 56/192 |
| 4,362,006 | 12/1982 | Dewzin | 56/192 |
| 4,392,339 | 7/1983 | Berlivet et al. | 56/228 |
| 4,429,517 | 2/1984 | Lohrentz | 56/192 |
| 4,433,735 | 2/1984 | Clark | 172/248 |

FOREIGN PATENT DOCUMENTS

| | | | |
|---|---|---|---|
| 900186 | 5/1972 | Canada | 56/192 |
| 85364 | 8/1983 | European Pat. Off. | 56/192 |
| 2801214 | 7/1978 | Fed. Rep. of Germany | 56/192 |

Primary Examiner—Robert Peshock
Assistant Examiner—John G. Weiss

[57] ABSTRACT

A double windrowing attachment for a harvester comprises a reversibly driveable conveyor shiftable between a first crop discharge position for forming a windrow inboard of one side of the harvester and a second crop discharge position for forming a second windrow along the opposite side of the harvester. The conveyor is supported on the attachment frame at only three points. One side of the conveyor is supported on a pair of feet movably supported on an elongated guide. The opposite side of the conveyor is supported by a shift arm which is used to shift the conveyor. The shift arm is pivotally mounted at one end to the attachment frame and movably mounted at the other end in a track fixed to the conveyor. The crop discharge positions are adjustable and permit a double windrow to be formed either in a side-by-side or in a stacked disposition. To prevent crop from being discharged from the conveyor onto uncut crop, a switch reverses a hydraulic drive for the conveyor prior to the beginning of movement of the conveyor from the first to the second crop discharge position and reverses the hydraulic drive responsive to the completion of movement of the conveyor from the second to the first crop discharge position. The attachment is mounted on the harvester frame by moving the harvester from a lowered harvesting position to an elevated transport position. The attachment is supported entirely off the ground by and extends rearwardly from the harvester frame and counterbalances the weight of the harvester header supported on and extending forwardly from the harvester frame.

25 Claims, 13 Drawing Figures

DOUBLE WINDROWING ATTACHMENT FOR HARVESTER

BACKGROUND OF THE INVENTION

This invention relates to crop harvesters known as mowers, mower-conditioners and windrowers and more particularly to attachments for such harvesters for combining the windrows from two passes of the harvester through the field into a "double" windrow.

The capacity of forage harvesters and balers has increased to the point where a single windrow does not fully utilize their capacity. In the past, the common practice has been to rake two windrows together once they are nearly dry. This provides the amount of crop needed in the windrow for the capacity of a forage harvester or a baler, but tends to accumulate rocks and other foreign objects in the windrow. In addition, raking causes leaf loss in legume crops resulting in poorer quality hay or forage.

There have been a number of proposals to provide a double windrowing attachment for conventional mowers, mower-conditioners and windrowers both of the pull-type and self-propelled variety. However, the proposed designs lack simplicity and ease of attachment and removal of the windrowing unit from the base harvesting machine. Attachment and removal of the windrowing attachment is desirable so that the operator may choose between operating the harvester as normally intended by laying a swath or a single windrow and using the attachment to combine the crop from two passes of the harvester through the field into a double windrow.

A second disadvantage is that the existing designs have not provided for adjustment of the crop discharge location to permit formation of either side-by-side or stacked double windrows depending upon harvesting conditions.

SUMMARY OF THE INVENTION

Accordingly, it is an object of this invention to provide a simplified method for attachment and removal of a double windrowing attachment to a harvester.

Another object of the invention is to provide an improved double windrowing attachment which is compatible with a variety of existing harvesters and more specifically provides a stable, balanced load on the main frame of certain types of harvesters.

Another object of the invention is to provide a double windrowing attachment which has a simple, reliable conveyor shifting mechanism for adjustment of the windrow placement.

Another object of the invention is to provide an adjustable conveyor for a double windrowing attachment which has a control for limiting the travel of the conveyor between first and second spaced, predetermined, adjustable crop discharge locations.

These and other objects of the invention which will be apparent from consideration of the following detailed description and accompanying claims are accomplished as follows. In a preferred embodiment, the double windrowing attachment is attached to a pull-type harvester. The pull-type harvester includes a main frame with a transverse member. A header is supported on and extends forwardly from the main frame. According to the improvement, the windrowing attachment is supported entirely off the ground by and extends rearwardly from the transverse member. This disposition of the windrowing attachment does not affect header flotation during harvesting. In addition, the windrowing attachment counterbalances the weight of the header resulting in improved life of the harvester frame.

The attachment is preferably mounted on the harvester with a pair of forward brackets fixed to the harvester and a pair of rear brackets fixed to the attachment and engageable, respectively, with the forward brackets. Each of the forward brackets includes an upwardly opening hook. Each of the rear brackets includes a catch receivable within a respective hook of each forward brackets.

Another feature of the invention resides in the method for mounting the attachment on the harvester. The method includes steps of positioning the attachment and harvester in an adjacent relationship and mounting the attachment on the harvester by moving the harvester frame from a lowered harvesting position to an elevated transport position. As the harvester frame is moved from the harvesting position to the transport position, the catches of the attachment rear brackets are received, respectively, within the hooks of the harvester forward brackets, the attachment is raised above the ground and the attachment pivots on the catches until the attachment rests against the harvester. The free pivoting relationship of the attachment to the harvester permits the attachment to pivot up relative to the harvester to clear obstructions to deep ditches.

The attachment includes a reversibly drivable conveyor which is shiftable between a first position to discharge crop into a windrow formed inboard and along one side of the harvester and a second position to discharge crop into a windrow formed generally outboard and along the opposite side of the harvester. Another feature of the attachment resides in the structure for movably supporting the conveyor on the attachment frame and the means for shifting the conveyor back and forth between the crop discharge locations for forming double windrows. The conveyor is supported on the frame at only three points. One side of the conveyor is supported on a pair of feet movably supported on an elongated guide. The opposite side of the conveyor is supported by a shift arm which is used to shift the table. The shift arm is pivotally mounted at one end to the attachment frame and movably mounted at the other end in a track fixed to the conveyor. The conveyor is shifted by a drive means, preferably hydraulic, for pivoting the shift arm back and forth relative to the attachment frame. The design of the three point support of the conveyor makes manufacturing tolerances for the conveyor less strict, requires low maintenance and is simple and reliable to operate.

Still another feature of the invention resides in the control means for limiting the travel of the conveyor between the first and second crop discharge positions for forming a double windrow. The control means includes a first switch means for deactivating the shifting means when the conveyor reaches the first position and a second switch means for deactivating the shifting means when the conveyor reaches the second position. Each switch means is operated by an actuator which includes a movably mounted support and a knob adjustably mounted on the support. Each actuator support is connected to and movable with the means for shifting the conveyor back and forth between the crop discharge positions. Each adjustable knob is engageable with a corresponding one of the switch means to deactivate the shifting means when the conveyor is located at one of the crop discharge positions. The adjustability of the crop discharge positions permits the double windrow to be formed in either a side-by-side or a stacked disposition. Furthermore, the adjustable knobs are located remotely from the shifting mechanism to permit convenient access by the operator.

DESCRIPTION OF THE PREFERRED EMBODIMENT

Such terms as forward, rearward, vertical, horizontal, lateral are used for convenience and are determined by reference to the machine in its standard operating position and relative to the direction of forward travel. The terms left and right are determined by standing at the rear of the machine and facing in the direction of travel.

I. General

Figure 1:
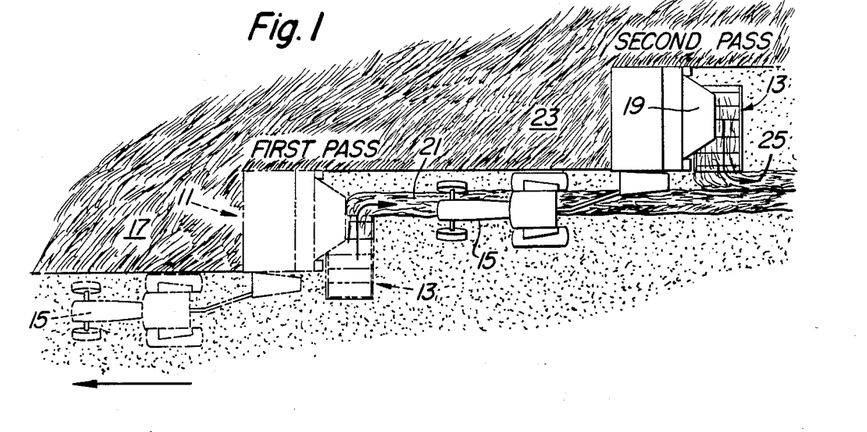
FIG. 1 is a schematic view illustrating one method for operating a harvester with an attached double windrowing attachment to produce a double windrow in accordance with a preferred embodiment of this invention.

Reference is first made to FIG. 1 which illustrates a sequential, pictorial, plan view of a preferred method for operating a harvester 11 with an attached windrowing attachment 13 for forming double windrows on sequential passes through a field. Harvester 11 is a pull-type implement. However, it will be recognized that the features of this invention are equally applicable to self-propelled implements. Harvester 11 may be of the mower-conditioner type harvester such as illustrated in U.S. Pat. No. 3,797,207, the disclosure of which is hereby incorporated by reference herein, or a Model 1219 mower-conditioner manufactured by Deere & Company, Moline, Ill. As is well known, such harvesters cut, condition and windrow the crop to be harvested. When it is desired to place windrows from consecutive passes of the harvester through the field in a double windrow, the double windrowing attachment 13 of this invention is mounted on harvester 11. During the first pass through the field, the tractor 15 is driven along a strip of the field where the crop has already been cut while the harvester 11 is offset from the tractor to harvest a swath 17. The crop, after being cut and conditioned by the harvester 11, is ejected through a windrowing shield 19 which guides the crop centrally where it falls partially onto attachment 13 and partially directly onto the ground to form a windrow 21 inboard of the right side of harvester 11. The crop discharge position of attachment 13 and location of windrow 21 are chosen such that there is sufficient room for the tractor 15 on the second pass to be driven over the windrow 21 without driving on the uncut crop or windrow 21. During the second pass, harvester 11 is pulled outboard to the right for the harvesting of the next swath 23. The attachment 13 is adjusted to a second crop discharge position such that the crop from swath 23, after passing through harvester 11, is ejected onto attachment 13 and discharged into a windrow 25 outboard of the left side of harvester 11 in an adjacent relationship to windrow 21.

The second crop discharge position and the location of windrow 25 may vary with operator preference. Windrow 25 may be stacked on, contiguous with or spaced from windrow 21. The maximum extent of windrow spacing is determined by the pickup width of the harvester (for example, a baler) used to pick up the windrow from the field. Thus, in some circumstances, it may be desirable for all or a portion of windrow 25 to be inboard of the left side of harvester 11.

II. Mounting of Attachment

Reference is now made to FIGS. 2 through 5 which illustrate in more detail the basic components of windrow attachment 13 in conjunction with cooperative components of harvester 11. Harvester 11 comprises a main frame 27, having a transverse member 29 and a spaced pair of upright members 31, 33 extending upwardly and rearwardly from transverse member 29. A crop harvesting header 35 is supported on the main frame and extends forwardly from the transverse member.

Harvester 11, as mentioned above, is described in detail in U.S. Pat. No. 3,797,207. However, because of the unique cooperative relationship of a harvester of this type with the windrowing attachment 13, the construction of harvester 11 will be briefly discussed herein. A pair of tranversely spaced wheel arms 37 (only one shown) is connected in trailing relationship to the transverse member 29 for vertically swinging movement and have ground engaging wheels 39, 41, respectively, rotatably mounted thereon. A pair of hydraulic cylinders 42 (only one shown, FIG. 4) act, respectively, between upright members 31, 33 and wheel arms 37 to vertically swing the wheel arms and thereby raise and lower the main frame 27 relative to the ground. Header 35 extends longitudinally above and forwardly from transverse member 29 and between upright members 31, 33. Upper links 43 (only one shown) and lower links 47 (only one shown) mount header 35 on frame 27. Upper links 43 extend between header 35 and the upper ends of upright members 31, 33, respectively. The lower links 47 extend between header 35 and wheel arms 37. Springs 51, 53 extend respectively between the upper ends of upright members 31, 33 and header 35 and urge the header upwardly relative to transverse member 29. The windrower shield 19 extends rearwardly between the upright members 31, 33 at a level above the tops of the wheels 39, 41 and terminates a substantial distance rearwardly of the wheels.

In accordance with one feature of this invention, when windrowing attachment 13 is disposed in an operative position (FIG. 4), attachment 13 is supported entirely off-ground and extends rearwardly from transverse frame member 29 of harvester 11. Attachment 13 is supported on harvester 11 via first and second dog leg shaped forward brackets 55, 57 respectively connected to the upright members 31, 33 of the harvester main frame 27 and first and second spaced upright, forwardly opening channel members forming rear brackets 59, 61 having lower ends rigidly fixed to the main frame of attachment 13 constituted by a transverse beam 63. Located at the upper rear sides of brackets 55, 57 are upwardly opening, "U"-shaped hooks 65, 67, respectively, for receiving mating catches 69, 71 formed by transverse pins respectively located in upper ends of rear brackets 59, 61. Catches 69, 71 are thus vertically spaced above beam 63, are forward of the center of gravity of attachment 13 and define a transverse pivot axis about which the attachment 13 may pivot vertically relative to harvester 11. The rear brackets 59, 61 are sized for respectively receiving the forward brackets 55, 57.

Figure 2A:
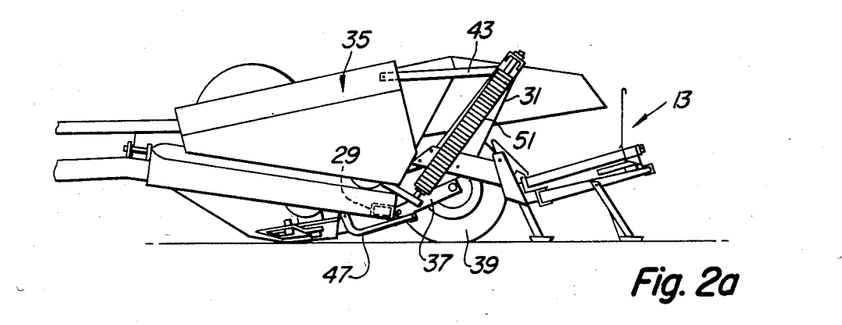
FIG. 2A is a schematic, left side, elevational view of the double windrowing attachment of FIG. 1 prior to attachment to a harvester. The harvester is shown in the harvesting position.
Figure 2B:
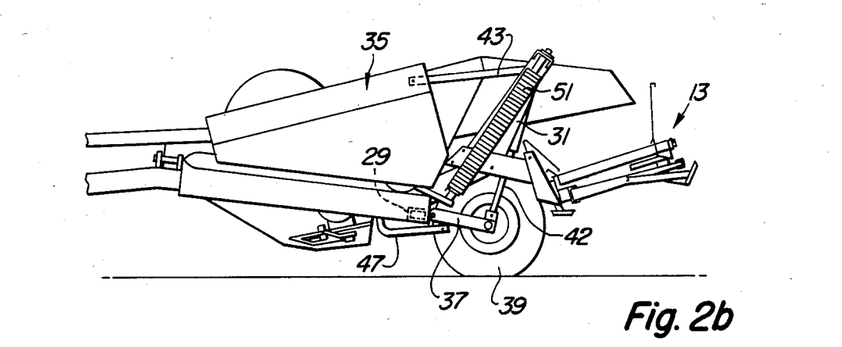
FIG. 2B is a schematic, side elevational view of the double windrowing attachment of FIG. 2A after attachment to the harvester. The harvester is shown in the transport position.

Another feature of this invention resides in the method for mounting attachment 13 on harvester 11. To practice the method, attachment 13 and harvester 11 are positioned in an adjacent relationship (FIG. 2A). This is typically done by backing the harvester until the rear is generally adjacent to attachment 13. Then, attachment 13 may be slid on three supporting jack stands 73, 75, (the third of which is not shown, FIGS. 3, 4) until the upwardly opening hooks 65, 67 are positioned beneath mating catches 69, 71. In accordance with the improvement of this invention, the attachment 13 is then mounted on harvester 11 by moving harvester frame 27 and header 35 supported thereon from a lowered harvesting position shown schematically in FIG. 2A to an elevated transport position shown in FIG. 2B. As the harvester frame 27 is moved from the harvester position to the transport position, the catches 69, 71 are, respectively, received within corresponding hooks 65, 67; the attachment is raised above the ground and the attachment 13 pivots on catches 69, 71 until attachment 13 rests against harvester 11. In this embodiment, attachment 13 pivots until transverse stops 77 (only one shown) of rear brackets 59, 61 rest against rear surfaces 79, 81 of forward brackets 55, 57. After elevation of the harvester to the transport position, the jack stands 73, 75 are moved from the extended supporting position to a storage position underneath attachment 13. To insure the retention of catches 69, 71 in hooks 65, 67, locking pins 87, 89 are located transversely to catches 69, 71, respectively, in an upper portion of forward brackets 55, 57.

Removal of attachment 13 from harvester 11 may be simply carried out generally by reversing the steps of the foregoing process for mounting. The steps for detachment of attachment 13 from harvester 11 include the removal of locking pins 87, 89 and the positioning and locking of jack stands 73, 75 in their downwardly extending supporting position. With the jack stands in place, then harvester 11 may be lowered from its transport position to its harvesting position. As the harvester is lowered, the catches 69, 71 are removed from mating hooks 65, 67 respectively. With the harvester 11 in the operating position and the attachment 13 resting on the ground immediately to the rear, attachment 13 may be slid rearwardly away from harvester 11 completing the removal of attachment 13.

It may be seen that attachment and removal of windrow attachment 13 to and from harvester 11 can be simply and easily accomplished by a single operator.

The design of the mounting for supporting attachment 13 on harvester 11 provides a number of significant advantages. First, the suspension and floatation of header 35 on main frame 27 is not affected by the installation and removal of attachment 13. Secondly, the weight of attachment 13 counterbalances or offsets the weight of header 35 on main frame 27 resulting in improved life for the harvester frame. Thirdly, hooks 65, 67 and catches 69, 71 are located above the main frame (constituted by transverse beam 63) and are forward of the center of gravity of attachment 13. This allows attachment 13 to pivot freely upwardly to clear obstructions or deep ditches during operation of the harvester 11 and windrow attachment 13. Fourthly, hooks 65, 67 have a "U"-shaped configuration which provides more tolerance for the placement of attachment 13 relative to harvester 11 during installation. This makes attachment easier by allowing the operator to back the harvester 11 and/or slide the attachment 13 into place so that catches 69, 71 are easily engaged by hooks 65, 67 as harvester 11 is elevated to the transport position. The disposition of rear surfaces 79, 81 and hooks 65, 67 within the forwardly opening rear brackets 59, 61 correctly position attachment 13 for operation as harvester 11 is raised without the need for additional operator adjustment.

III. Conveyor

In accordance with another feature of the invention and in reference to FIGS. 4–6 and 10, attachment 13 further comprises a reversibly driven conveyor 91 which is movably supported on transverse beam 63 at preferably three points and is shiftable back and forth on beam 63 with a shifting means 93 between a first crop discharge position for forming a windrow inboard and along one side of the harvester and a second crop discharge position for forming a windrow along the opposite side of the harvester. Two or more (preferably two as shown herein) points of support are along one side of conveyor 91 and only one point is provided on the opposite side of conveyor 91. The two points of support for one side of conveyor 91 on beam 63 are provided by a pair of feet constituted by a pair of rollers 95, 97 movably supported on a guide 99 extending lengthwise of transverse beam 63. In the preferred embodiment, the rollers 95, 97 are identical and each has a pair of spaced flanges 101, 102 and 103, 104, respectively, for retaining the rollers on guide 99. In addition, adjustable hold down clips 105, 107 aid in the retention of rollers 95, 97 on guide 99. Clips 105, 107 are adjustable by a plurality of slots 108 provided therein and through which bolts 110 are mounted and attached to conveyor 91. To minimize crop buildup, rollers 95, 97 are, respectively, mounted on plates 109, 111 extending below the respective flanges of each roller. Plates 109, 111 push the crop away from guide 99 before the crop or other debris builds up between guide 99 and rollers 95, 97. It will be appreciated by those skilled in the art that the function of plates 109, 111 to push debris away from rollers 95, 97 may be accomplished by a plate or other member which is independent of the support of rollers 95, 97.

The third point of support (and the sole point for the second opposite side) for conveyor 91 on beam 63 is provided by a tapered arm 113 pivotally mounted at one end to transverse beam 63 by a pivot 114 and slidably mounted at the other end in a track 115 fixed to a bottom surface of conveyor 91. The tapered design of arm 113 minimizes weight and provides more flexibility to minimize shock loading of the harvester frame 27.

In accordance with the features of this invention, the design of the mechanism for supporting the conveyor 91 at three points results in a number of advantages. First, the conveyor shifting means 93 will have a reduced tendency to bind compared to conventional designs. Secondly, manufacture of conveyor 91 is easier as warpage of conveyor 91 is less critical. Thirdly, rollers 95, 97 which ride on guide 99 require less lubrication compared to other conventional supports which have metal to metal contact. Fourth, the force required to shift the conveyor 91 back and forth is small, making it possible to design the conveyor frame and the shifting mechanism 93 lighter.

In addition to the conveyor supporting function of arm 113, arm 113 constitutes one component of the shifting mechanism 93 for moving conveyor 91 laterally back and forth between the two crop discharge positions. Force is transmitted to conveyor 91 through a sealed bearing 116 mounted at the remote end of arm 113. Bearing 116 runs in track 115. Pivotal movement of arm 113 about pivot 114 moves bearing 116 in an arc which, in turn, causes conveyor 91 to move laterally in a straight line.

Track 115 and bearing 116 are designed to move freely with respect to each other during the shifting of the conveyor 91 back and forth. This is accomplished in two ways. First, track 115 has sidewalls 117, 119 (FIG. 6) which diverge outwardly from the lower surface of conveyor 91. Secondly, arm 113 has a low torsional rigidity which allows bearing 116 to tilt in the track 115 as conveyor 91 is shifted. Allowing bearing 116 to tilt in this manner permits bearing 116 to roll on an upper corner rather than sliding on the top surface of bearing 116. This reduces the area of frictional engagement between track 115 and bearing 116 and thereby reduces the need for lubrication.

Shifting means 93 for conveyor 91, constituted by the arm 113 and track 115, discussed above, is operated by a hydraulic cylinder 121 for pivoting arm 113 back and forth on pivot 114. Hydraulic cylinder 121 is mounted at one end to beam 63 on a pivot 122 and is mounted at the other to arm 113 on a pivot 120. Extension of a cylinder rod 123 of cylinder 121 shifts conveyor 91 to the right and retraction of rod 123 shifts conveyor 91 to the left.

Conveyor 91 (FIGS. 4, 5) is comprised of a pair of spaced sides 124, 125 interconnected by a plurality of supports 126. A canvas 127 is rotatably supported on and extends between a drive roll 128 and driven roll (not shown). Drive roll 128 is driven by an integral, conventional hyraulic motor 130 shown in FIG. 9.

IV. Electrohydraulic Circuit

Figure 7:
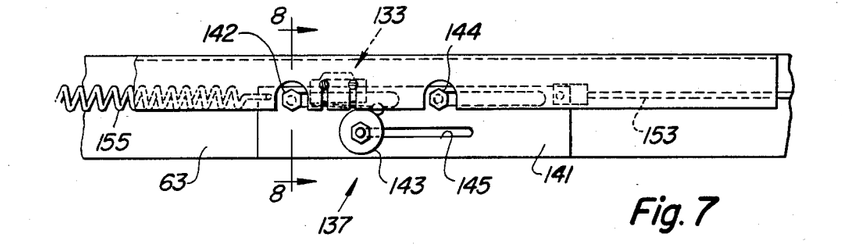
FIG. 7 is an enlarged, fragmentary view of a portion of the windrowing attachment taken along line 7—7 of FIG. 5.
Figure 8:
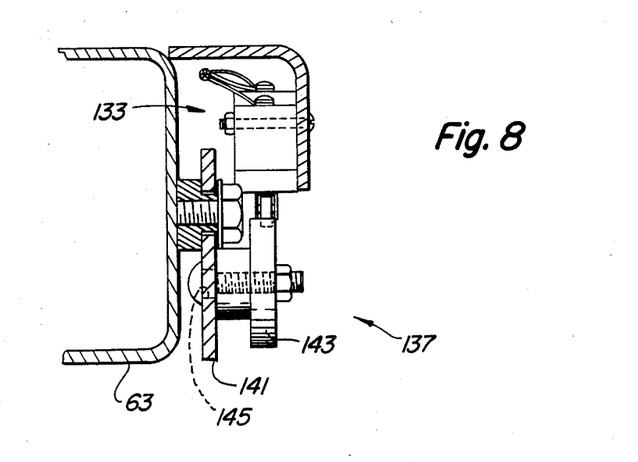
FIG. 8 is an enlarged, cross-sectional view of a portion of the windrowing attachment taken along lines 8—8 of FIG. 7.
Figure 9:
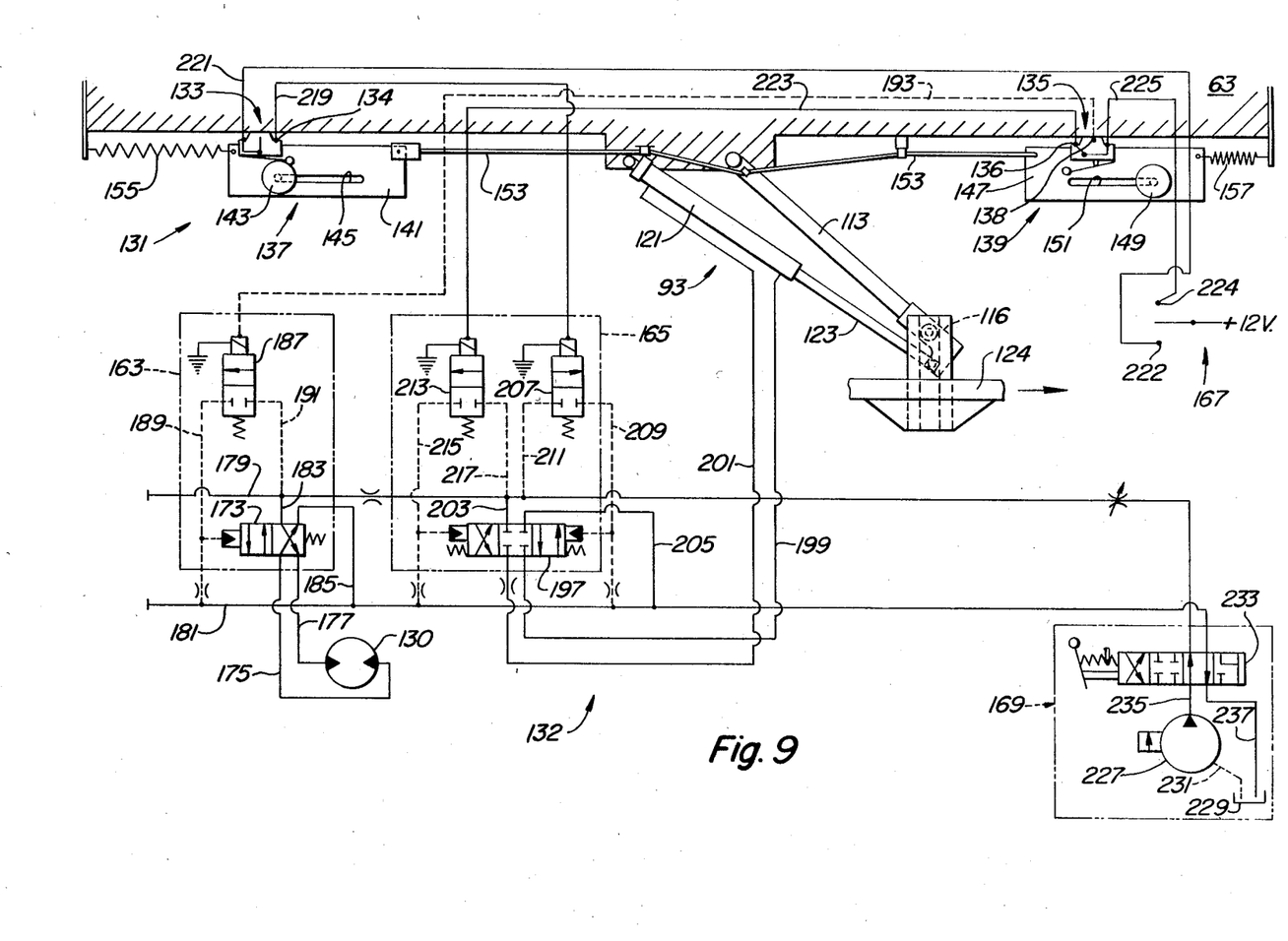
FIG. 9 is a schematic view of a portion of the windrowing attachment of FIG. 3.
Figure 10:
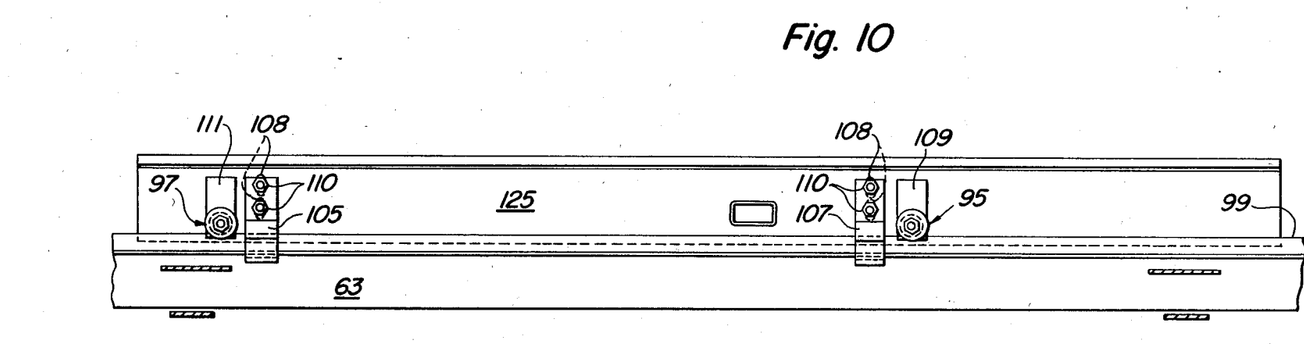
FIG. 10 is an enlarged cross-sectional view taken along line 10—10 of FIG. 4.

Reference is now made to FIG. 9 which illustrates in schematic form an electrohydraulic circuit 132 for operation (i.e., driving and shifting) of conveyor 91 and an adjustable control means 131 (shown in FIGS. 5, 7-9) for semiautomatically sequencing the operation of circuit 132 in accordance with another feature of this invention. Circuit 132 includes cylinder 121 for operating shifting means 93 and motor 130 for reversibly driving conveyor 91. Control 131 is adjustable and is used to set limits on the travel of conveyor 91 back and forth between first and second positions for right-hand and left-hand crop discharge, respectively. Adjustment of the crop discharge positions allows placement of double windrows either side-by-side or stacked one on top of the other. Control means 131 includes first and second actuators 137, 139 for operating, respectively, a first switch means 133 for deactivating shifting means 93 when the conveyor 91 reaches the left-hand crop discharge position and a second switch 135 for deactivating shifting means 93 when the conveyor 91 reaches the second or right-hand crop discharge position and for controlling reversal of motor 130. Switches 133, 135 in the preferred embodiment are normally closed microswitches. Switch 133 has a normally closed contact 134 connected electrohydraulically with cylinder 121. Switch 135 has a normally closed contact 136 connected electrohydraulically to cylinder 121 and a normally open contact 138 connected electrohydraulically to motor 130. Actuator 137 (FIGS. 7, 8) includes (1) a support 141 slidably mounted longitudinally of beam 63 on bolt assemblies 142, 144 fixed to beam 63 and (2) a knob 143 adjustably fixed in a slot 145 of support 141. Similarly, actuator 139 includes a support 147 slidably mounted to beam 63 and a knob 149 adjustably fixed in slot 151 of support 147. Actuators 137, 139 are connected to and movable with arm 113 of shifting means 93 by a connecting means 153 which in the preferred embodiment is a cable and biasing means 155, 157 for biasing supports 141, 147 outwardly and away from arm 113. In the preferred embodiment, the biasing means 155, 157 may be simply a pair of coil springs, one of which is connected between support 141 and beam 63 and the other of which is connected between support 147 and beam 63.

The adjustable control means 131 provides easy accessibility to the operator for adjustment of the crop discharge positions of conveyor 91. In addition, the use of a cable 153 as the connecting means provides simplicity and low cost, provides less susceptibility to damage due to engagement with foreign objects in field operation and provides easy adjustment if pivot 114 of arm 113 is relocated for use of the windrow attachment 13 on harvesters having a different width.

Circuit 132 further incudes (1) a conveyor motor valve 163 for operating the reversible conveyor motor 130, (2) a conveyor shift valve 165 for operating hydraulic cylinder 121, (3) an operator control switch 167 for operating shifting means 93 for shifting conveyor 91 back and forth between the two crop discharge positions and (4) a hydraulic supply 169 for supplying hydraulic fluid to cylinder 121 and motor 130. Conveyor motor valve 163 comprises (1) a pilot operated valve 173 connected to motor 130 via conduits 175, 177 and to tractor supply conduits 179, 181 via conduits 183, 185, respectively, and (2) a solenoid operated pilot valve 187 connected to pilot operated valve 173 via pilot conduit 189 and to tractor supply conduit 179 via conduit 191. The solenoid of pilot valve 187 is connected to the normally open contact 138 of right-hand microswitch 135 via conductor 193. A return spring of pilot operated valve 173 biases the valve into a condition to supply fluid to motor 130 to drive the conveyor 91 toward the left-hand side of harvester 11 which is the direction necessary for the second pass of harvester 11 shown in FIG. 1. When solenoid operated pilot valve 187 is actuated and shifts valve 173, fluid is supplied to motor 130 in a direction to drive conveyor 91 toward the right-hand side of the machine which is the direction necessary for the first pass of harvester 11 shown in FIG. 1.

Conveyor shift valve 165 includes a pilot operated valve 197 connected to hydraulic cylinder 121 via conduits 199, 201 and connected to tractor supply conduits 179, 181 via conduits 203, 205. Valve 197 is spring biased into a closed position. Valve 197 is actuated to extend cylinder 121 via a solenoid operated pilot valve 207 which is connected to valve 197 via pilot conduit 209. Pilot valve 207 is connected to tractor supply conduit 179 via conduit 211. Valve 197 is actuated to retract cylinder 121 via a solenoid operated pilot valve 213 which is connected to pilot operated valve 197 via a conduit 215. Pilot valve 213 is connected to tractor supply conduit 179 via conduit 217.

The solenoid of pilot valve 207 is connected in series with left-hand microswitch 133 via conductor 219 and with operator control switch 167 via conductor 221. Closure of control switch 167 to a contact 222 completes the circuit to the solenoid of valve 207 to extend cylinder 121 and shift conveyor 91 to the right into a position for the second pass of the harvester as shown in FIG. 1. Closure of control switch 167 to contact 224 completes the circuit to the solenoid of pilot valve 213 to retract cylinder 121 and shift conveyor 91 to the left into a crop discharge position for the first pass of harvester 11 as shown in FIG. 1. Solenoid operated pilot valve 213 is connected in series with normally closed contact 136 of right-hand microswitch 135 via conductor 223 and with control switch 167 via conductor 225.

Hydraulic supply 169 (FIG. 9) is preferably a conventional tractor hydraulic supply located on the towing tractor. However, supply 169, if desired, may be independent of the tractor supply. For example, supply 169 may be located on attachment 13 or harvester 11 and would be energized by a drive on harvester 11. Tractor supply 169 is comprised of a variable displacement, pressure compensated pump 227 and a reservoir 229 connected to pump 227 via a conduit 231. Operation of pump 231 is controlled by a manually operated valve 233 which is connected to supply conduits 179, 181, which are in turn connected to conveyor shift valve 165 and to conveyor motor valve 163 as explained above. Valve 233 is connected to pump 227 via conduit 235 and to reservoir 229 via conduit 237.

Figure 3:
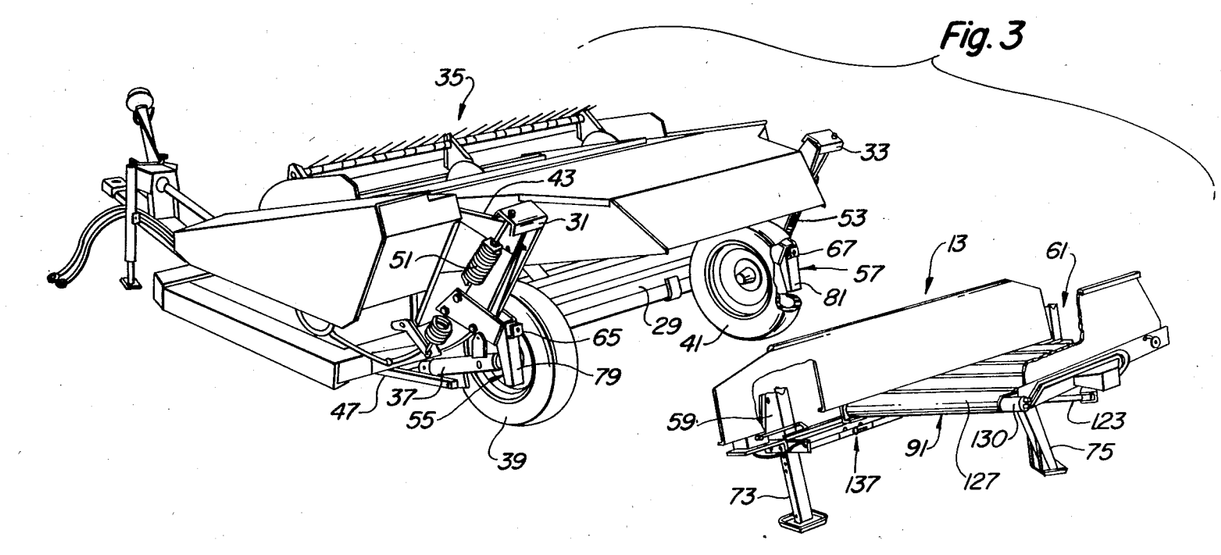
FIG. 3 is a left rear, fragmentary, perspective view of a preferred embodiment of a windrowing attachment and harvester of this invention with the windrowing attachment shown in a detached condition.
Figure 4:
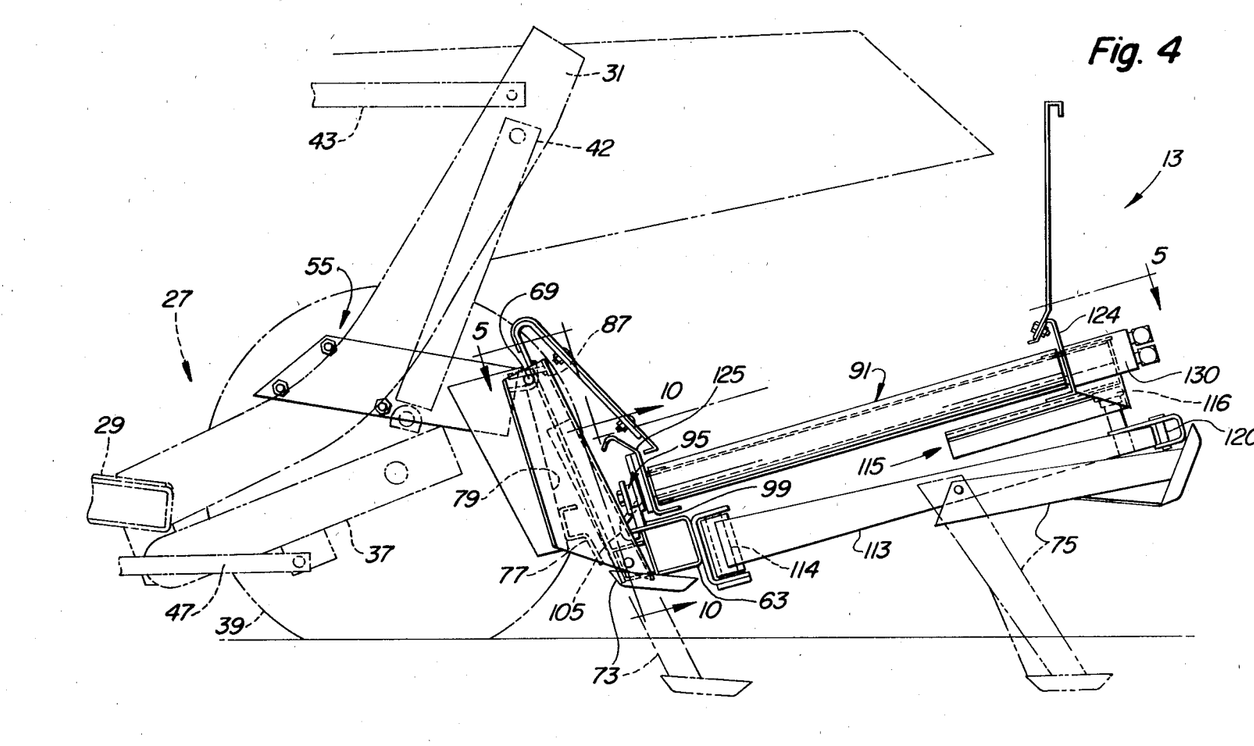
FIG. 4 is a left side, elevational view of the windrowing attachment and harvester shown in FIG. 3 with the windrowing attachment mounted on the harvester in a harvesting position.
Figure 5:
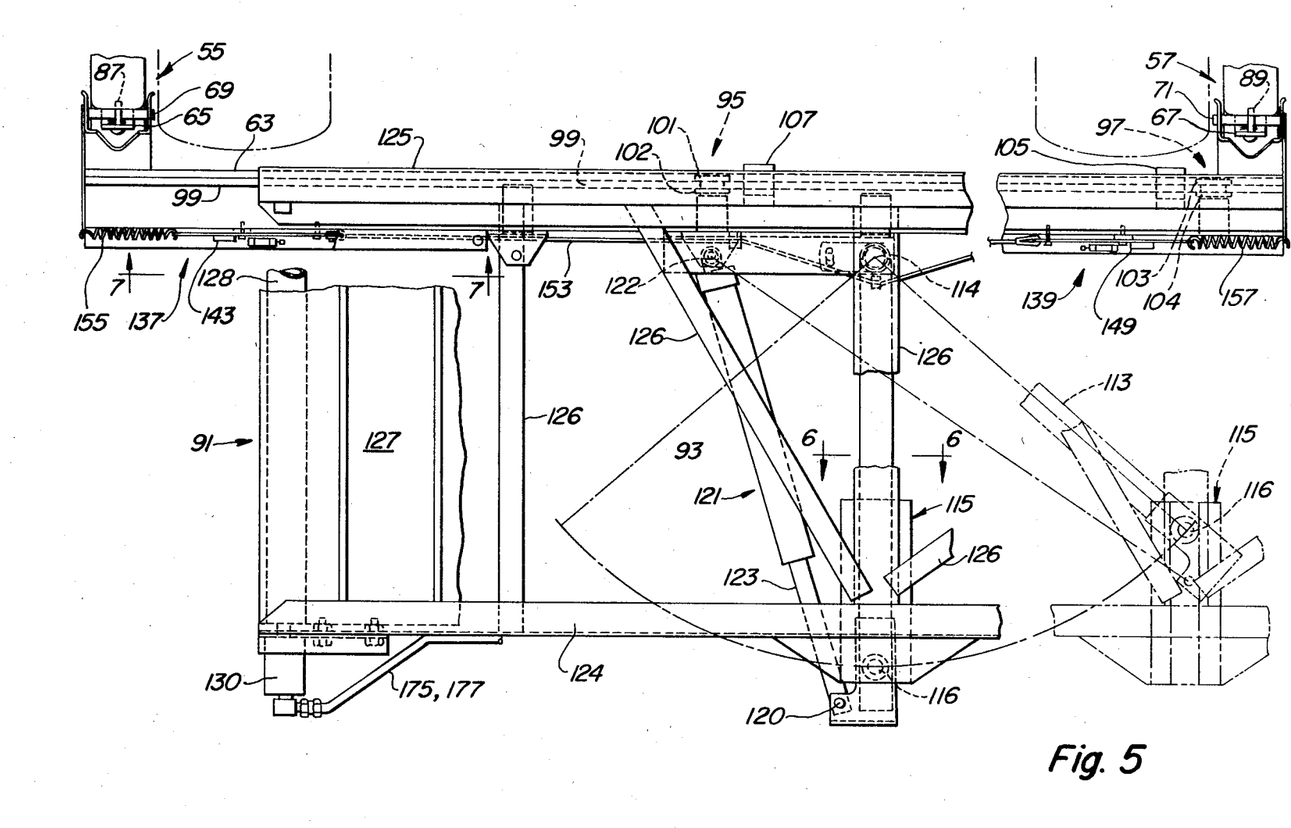
FIG. 5 is a fragmentary, plan view of the windrowing attachment taken along line 5—5 of FIG. 4.
Figure 6:
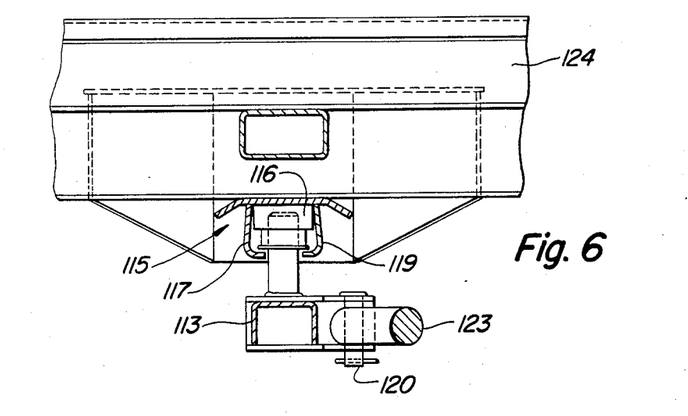
FIG. 6 is a fragmentary, cross-sectional view of a portion of the windrowing attachment taken along line 6—6 of FIG. 5.

Electrohydraulic circuit 132 is operated as follows. The condition of the circuit shown in FIG. 9 is the unactuated condition from which the operator may start at the beginning of a harvesting operation. To condition the double windrowing attachment 13 apparatus for a first pass through a field wherein conveyor 91 is shifted to the left and discharges crop to the right (canvas 127 rotated clockwise as viewed in FIG. 3). In the position shown in FIG. 9, tractor hydraulic supply 169 supplies fluid along conduit 179 from pump 227 and returns fluid to reservoir 229 along conduit 181. Operator control switch 167 is actuated to complete the circuit path to contact 224 which supplies power via conductor 225, switch 135, and conductor 223 to energize pilot valve 213. Pilot valve 213 shifts valve 197 to the right in FIG. 9 to supply fluid along conduit 199 to retract cylinder 121 which as seen in FIG. 9 results in the shifting of conveyor 91 to the left until switch 135 is actuated by knob 149 as actuator 139 is shifted to the left against the bias of spring 157. Actuation of switch 135 opens the circuit at the normally closed contact 136 to pilot valve 213 and closes the circuit path to contact 138 and conductor 193 to supply power to pilot valve 187. Pilot valve 187 actuates valve 173 to supply fluid along conduit 175 to drive conveyor motor 130 and canvas 127 in a clockwise direction (FIG. 3). A return fluid path from cylinder 121 is through conduit 201, valve 197, and conduit 205 to tractor supply conduit 181. A return fluid path from motor 130 is through conduit 177, and valve 173 conduit 185 to conduit 181.

Upon completion of the first pass, the operator without stopping the harvesting process, operates the control switch 167 to open the circuit path to contact 224 and to close the circuit path to contact 222. Power is thus supplied along conductor 221 through switch 133 and conductor 219 to energize the solenoid of pilot valve 207. Pilot valve 207 shifts valve 197 to the left (FIG. 9) to supply fluid under pressure along conduit 201 to extend the cylinder 121 and to shift conveyor 91 to the right as shown in FIG. 9. Conveyor motor valve 163 is deenergized by moving switch 167 from contact 224. As a result, pilot operated valve 173 is restored to its spring leftward position by its biasing (FIG. 9). Fluid is then supplied along conduit 177 to drive conveyor motor 130 and canvas 127 in a counterclockwise direction. Return fluid flow from motor 130 is along conduit 175, valve 173 and conduit 185 to tractor supply conduit 181. Thus, crop delivery to the left is initiated immediately prior to the shifting of conveyor 91 to the right. The shifting of conveyor 91 to the right (FIG. 9) continues until switch 133 is actuated by the engagement of knob 143 as actuator 137 is shifted to the right against the bias of spring 155. Actuation of switch 133 opens the circuit path to pilot valve 207 via normally closed contact 134 and conductor 219. The deactuation or opening of pilot valve 207 permits pilot operated valve 197 to be restored to its open position terminating extension of cylinder 121. Return fluid flow from cylinder 121 as it is extended is through conduit 199, valve 197 and conduit 205 to conduit 181.

Upon completion of a second pass, as shown in FIG. 1, the operator then must condition the windrow attachment 13 for a second "first pass" of harvester 11, that is, the formation of the first windrow of a double windrow. To return attachment 13 to a first pass condition, control switch 167 is changed to open the circuit path to contact 222 and conductor 221 and to close the circuit path to contact 224 and conductor 225 to actuate conveyor shift valve 165 to retract cylinder 121. As retraction of cylinder 121 is begun switch 133 is deactivated (i.e., switch 133 is restored to a closed condition). This has no effect as contact 222 is open. As the conveyor 91 is shifted to the left, crop delivery continues to be to the left (FIG. 1) until switch 135 is actuated by actuator 139. Thus, conveyor 91 is fully shifted to the left prior to the reversal of conveyor drive motor 130. The reversal of conveyor drive motor 130 takes place by the actuation of switch 135 to close the circuit path to contact 138 and conductor 193 to shift conveyor motor valve 163 to reverse motor 130 and drive canvas 127 in a clockwise direction to deliver crop to the right in FIGS. 1, 5.

It will thus be seen that in shifting attachment 13 from a first pass to a second pass condition, reversal of canvas motor 130 is made to begin the delivery of crop to the left prior to any shifting of conveyor 91 to the right. Also, in positioning attachment 13 from the second pass to the first pass condition, reversal of conveyor motor 130 is delayed until conveyor 91 is fully shifted to the left. The immediate reversal of the conveyor direction in going from the first pass to the second pass condition and the delayed reversal when going from the second pass back to the first pass condition prevents crop from being ejected onto unharvested crop or into the space between the unharvested crop and the first windrow over which the tractor must drive during the second pass.

V. Alternate Operating Modes

Figure 11:
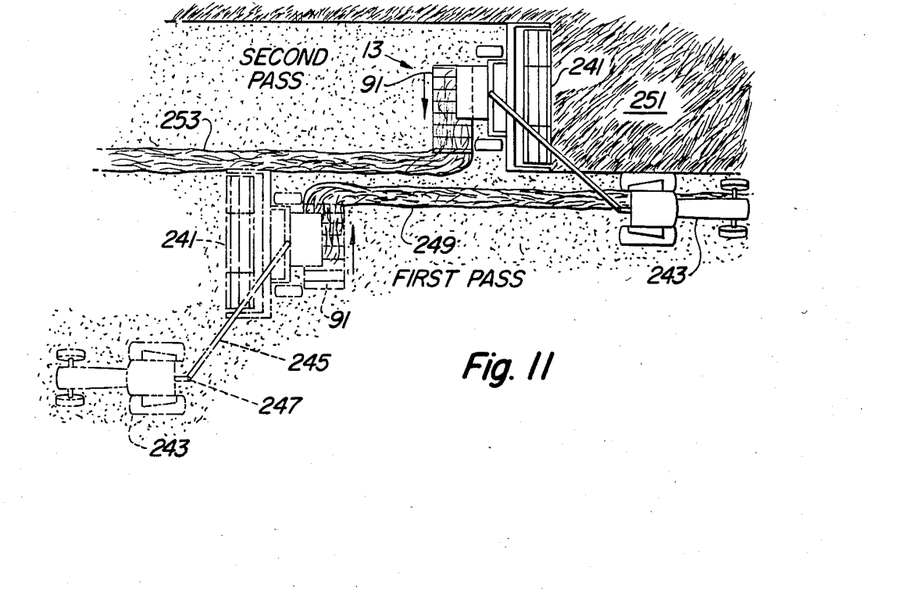
FIG. 11 is a schematic view illustrating another method for operating a harvester with an attached double windrowing attachment to produce a double windrow in accordance with a second embodiment of this invention.

Reference is now made to FIG. 11 which illustrates a second embodiment of this invention. Attachment 13 is also usable with a mower-conditioner 241 or harvester which is operable on either side of a towing tractor 243. Harvester 241 may be of the type disclosed in U.S. Pat. No. 4,196,917. Harvester 241 is provided with an arched hitching tongue 245 extending from a location approximate to the transverse center of the harvester frame to a tractor hitch 247. Tongue 245 is swingable over the frame of the harvester to permit the harvester to be positioned by a control mechanism (not shown) to operate on either side of the tractor. In operation, the operator positions the harvester outboard the tractor on the side on which the unharvested crop is standing. In the first pass (shown in dotted lines), attachment 13 is shifted to the left to a first crop discharge position for forming a windrow 249 inboard of harvester 241 and to the right of attachment 13. At the end of the field for the second pass, tractor 243 and harvester 241 are turned around and harvester 241 is moved outboard of the left side of the tractor so that harvester 11 is again on the side of the tractor on which the unharvested crop 251 is standing. In addition, attachment 13 is shifted to the right to a crop discharge position to form a second windrow 253 partially outboard of harvester 241 and to the right of attachment 13. Harvesting in this manner is continued by forming a first windrow by pulling the harvester in a direction and then forming a second windrow combined into a double windrow with the first by pulling the harvester in a parallel and opposite direction for the return travel of the harvester across the field. It will be seen that this embodiment differs from the first embodiment shown in FIG. 1 by the method of making the second pass of the harvester. In the first embodiment (FIG. 1), the conveyor 91 is shifted to the right and delivers crop to the left of conveyor 91. In the second embodiment shown in FIG. 11, the conveyor is shifted to the right and delivers crop to the right of the conveyor. Such a variation in operation of attachment 13 requires modification (not shown) of the electrohydraulic circuit 132 shown in FIG. 9.

Figure 12:
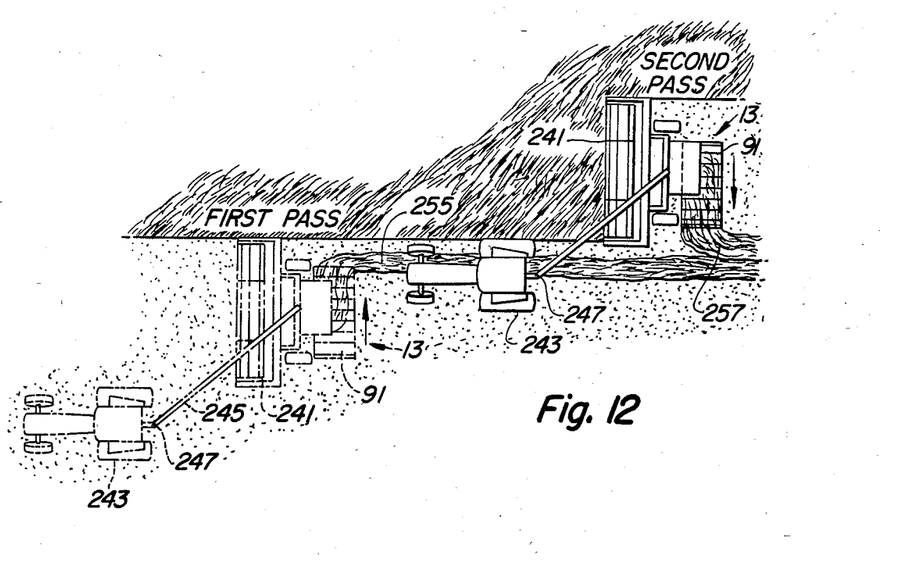
FIG. 12 is a schematic view illustrating another method for operating the harvester and attached double windrowing attachment shown in FIG. 11 to produce a double windrow.

Reference is now made to FIG. 12 which illustrates another method for operating the harvester 241 and windrowing attachment 13 shown in FIG. 11. In the method illustrated in FIG. 12, harvester 241 and windrow attachment 13 are towed around a field in the same direction for the first and second passes. In the first pass, conveyor 91 of attachment 13 is shifted to the right to a crop discharge position for forming a first windrow 255 inboard of one side of harvester 241. Conveyor 91 is driven clockwise or toward the right-hand side of harvester 241. In the second pass, conveyor 91 of attachment 13 is shifted to the left to a crop discharge position for forming a windrow 257 along the left side of the harvester 241. Conveyor 91 is driven counterclockwise or toward the left side of harvester 241. It will be appreciated that in the first pass, conveyor 91 is shifted to the right and delivers crop toward the right side of harvester 241. In the second pass, conveyor 91 is shifted to the left and delivers crop toward the left side of harvester 241. Such a variation also requires a modification (not shown) of the electrohydraulic circuit 132 shown in FIG. 9.

The invention disclosed in this application has been explained in connection with certain preferred embodiments. Other variations and modifications of this invention will be apparent to those skilled in the art. Accordingly, it is intended that all such variations and modifications be comprehended within the scope of the invention as defined in the appended claims.

I claim:

1. In a windrowing attachment for a harvester comprising:
    a frame;
    a conveyor movably mounted on said frame; and
    means for shifting said conveyor back and forth on said frame between a first crop discharge position for forming a windrow inboard of one side of the harvester and a second crop discharge position for forming a windrow along the opposite side of the harvester; the improvement comprising:
    said shifting means comprising (a) a track fixed to said conveyor and (b) a shift arm pivotally mounted at one end to said frame and movably mounted at the other end in said track.

2. The attachment of claim 1 further comprising a guide extending in a first direction and adjustably supporting said conveyor relative to said frame.

3. The attachment of claim 2 further comprising a pair of feet movably engaging said guide.

4. The attachment of claim 3 wherein:
    said pair of feet are a pair of rollers engaged on said guide, each roller having a pair of spaced flanges for retaining said roller on said guide.

5. The attachment of claim 4 further comprising first and second members for pushing debris away from each of said rollers and guide; each member fixed adjacent a respective one of said rollers, extending toward said guide and extending beyond said roller flanges.

6. The attachment of claim 1 wherein (a) said track is fixed underneath said conveyor and includes a pair of outwardly diverging sidewalls and (b) said shift arm has low torsional rigidity and twists under load when shifting said conveyor back and forth.

7. The attachment of claim 6 wherein said shift arm comprises a cylindrical bearing disposed in said track and rotatably mounted about an axis normally generally perpendicular to a longitudinal axis of said track when said shift arm is in a static state.

13

8. The attachment of claim 1 further comprising:
a first switch means for deactivating said shifting means when said conveyor reaches said first position;
a second switch means for deactivating said shifting means when said conveyor reaches said second position;
first and second actuators, each including a support and a knob adjustably mounted on said support, said first and second actuator supports movably mounted on said frame adjacent said first and second switching means, respectively, and said first and second actuator knobs engageable with said first and second switch means, respectively; and
means for connecting said first and second actuators to said shift arm.

9. The attachment of claim 8 wherein:
said arm is pivotably mounted to said frame a location between said first and second actuator supports; and
said connecting means is a cable connected to and movable with said arm and actuator supports and further includes means for biasing said first and second supports outwardly away from said shift arm.

10. In a windrowing attachment for a harvester comprising:
a frame;
a conveyor movably mounted on said frame; and
means for shifting said conveyor back and forth on said frame; the improvement comprising:
a first switch means for deactivating said shifting means when said conveyor reaches a first crop discharge position for forming a windrow inboard of one side of said harvester;
a second switch means for deactivating said shifting means when said conveyor reaches a second crop discharge position for forming a windrow along the opposite side of said harvester; and
first and second actuators, each including a support and a knob adjustably mounted on said support, said first and second actuator supports movably mounted on said frame adjacent said first and second switching means, respectively, and said first and second actuator knobs engageable with said first and second switch means, respectively; and
means for connecting said first and second actuators to said shifting means.

11. The attachment of claim 10 wherein:
said connecting means is a cable connected to and movable with said shifting means and said actuator supports and further includes means for biasing said first support in one direction and said second support in another direction.

12. The actuator of claim 11 wherein:
said shifting means comprises a track fixed to said conveyor and an arm pivotably mounted at one end to said frame at a location between said first and second actuator supports and slidably mounted at the other end in said track; and
said one direction and said other direction are opposite and away from said arm.

13. The attachment of claim 10 wherein said first and second supports are movably mounted for sliding back and forth in opposite directions, said first and second actuator supports each include a slot for adjustably mounting said knob for movement back and forth in parallel with said opposed directions.

14

14. In a windrowing attachment comprising:
a frame;
a conveyor movably mounted on said frame; and
means for shifting said conveyor back and forth on said frame; the improvement comprising:
said conveyor supported relative to said frame, at two points along a first side of said conveyor and at only one point along a second opposite side of said conveyor.

15. The attachment of claim 14 further comprising:
a guide extending in a first direction and adjustably supporting said first conveyor side; and
a pair of feet movable along said guide.

16. The attachment of claim 25 wherein said shifting means comprises (a) a track fixed to the conveyor and (b) an arm pivotably mounted at one end to said frame and movably mounted at the other end in the track.

17. The attachment of claim 15 wherein each foot is a roller engaged on the guide and has a pair of spaced flanges for retaining the roller on the guide.

18. The attachment of claim 17 further comprising first and second members for pushing debris away from each of said rollers and guide, each member fixed adjacent a respective one of said rollers, extending toward said guide and extending beyond said roller flanges.

19. In a windrow attachment for a harvester comprising:
a frame;
a reversibly drivable conveyor movably mounted on said frame;
means for shifting said conveyor back and forth on said frame between a first crop discharge position for forming a windrow inboard of one side of the harvester and a second crop discharge position for forming a windrow along the opposite side of the harvester; and
means for reversibly driving said conveyor; the improvement comprising:
circuit and control means for reversing said drive means prior to shifting of the conveyor from the first to the second crop discharge position and for reversing the drive means responsive to the completion of movement of the conveyor from the second to the first crop discharge position.

20. The attachment of claim 19 wherein said circuit and control means comprises:
a first switch means for deactivating the shift means when the conveyor reaches the first crop discharge position; and
a second switch means for deactivating the shift means when the conveyor reaches the second crop discharge position.

21. The attachment of claim 20:
wherein (a) said drive means is hydraulic, (b) said first switch means comprises a normally open contact and a normally closed contact and (c) said second switch means comprises a normally closed contact; and
further comprising (a) a solenoid operated, hydraulic conveyor drive means control valve connected hydraulically to said drive means and connected electrically to said normally open contact, (b) a hydraulic cylinder for operating said shift means, and (c) a solenoid operated, conveyor shift valve connected hydraulically to the cylinder and connected electrically to the normally closed contact of said first switch means and to the normally closed contact of the second switch means.

22. The attachment of claim 20 wherein said circuit and control means comprises:

first and second actuators, each including a support and a knob adjustably mounted on said support, said first and second actutator supports movably mounted on said frame adjacent said first and second switching means, respectively, and said first and second actuator knobs engageable with said first and second switch means, respectively; and means for connecting said first and second actuators to said shifting means.

23. The attachment of claim 20 wherein said circuit and control means comprises an operator control switch for reversing said drive means and immediately thereafter actuating said shifting means for shifting said conveyor from said first to said second crop discharge position.

24. In a pull-type harvester including a main frame having a transverse member and a pair of upright members respectively fixed to opposite ends of the transverse member, a header supported on the main frame and extending forwardly from the transverse member, a pair of transversely spaced wheels vertically adjustably connected to the main frame for raising and lowering the latter relative to the ground for respectively disposing the header in transport and harvesting positions, windrow forming shields connected to the frame and extending from the header rearwardly beyond the wheels for directing a harvested crop to a central location behind the harvester and a transverse windrowing attachment including an attachment frame coupled to the main frame of the harvester and supporting a cross conveyor located for receiving crop passing through the forming shields, the improvement comprising: said attachment including a pair of forward brackets, separable from the remainder of the attachment, respectively releasably secured to said upright members and respectively including a pair of upwardly opening hooks at an upper rear location thereof; said remainder of the attachment including the attachment frame which includes a transverse member located at the lower front thereof; a pair of rear brackets, in the form of upright, forwardly opening channel members having lower ends rigidly fixed to the attachment frame transverse member; said pair of rear brackets respectively having said pair of forward brackets located therein and having a pair of transverse catch members located in the upper ends thereof and received in the pair of hooks; support means retractably coupled to said attachment frame for supporting said remainder of the attachment in a free-standing condition on the ground when the remainder of the attachment is disconnected from the pair of forward brackets; and said pair of transverse catch members being at a location above the level of the pair of hooks when the header is in its harvesting position and the support means is positioned for supporting the remainder of the attachment in its free-standing condition on the ground.

25. The harvester defined in claim 24 wherein said pair of catch members are transverse pins which respectively cooperate with the pair of hooks to pivotally mount the remainder of the attachment to the harvester for permitting the remainder of the attachment to pivot up should it engage the ground during operation, for example.

* * * * *